United States Patent [19]
Harrison

[11] 4,443,026
[45] Apr. 17, 1984

[54] GAS SUSPENSION SYSTEMS FOR VEHICLES

[75] Inventor: Anthony W. Harrison, Birmingham, England

[73] Assignee: Lucas Industries Limited, Birmingham, England

[21] Appl. No.: 335,445

[22] Filed: Dec. 29, 1981

[30] Foreign Application Priority Data

Jan. 10, 1981 [GB] United Kingdom ............... 8100737

[51] Int. Cl.³ ............................................. B60G 11/28
[52] U.S. Cl. ................................. 280/714; 280/5 R; 280/702; 280/DIG. 1
[58] Field of Search ............... 280/714, 702, 704, 706, 280/707, 712, 5 R, DIG. 1; 267/64 R, 65 R, 65 D, 64.11; 137/625.21, 625.31

[56] References Cited

U.S. PATENT DOCUMENTS

| | | | |
|---|---|---|---|
| 2,862,726 | 12/1958 | Bertsch | 280/702 |
| 2,965,389 | 12/1960 | Dietrich | 280/712 |
| 2,976,053 | 3/1961 | Pribonic et al. | 280/714 |
| 2,989,983 | 6/1961 | Valentine | 280/714 |
| 3,059,918 | 10/1963 | Pribonic | 280/714 |
| 4,015,859 | 4/1977 | Hegel et al. | 280/714 |

FOREIGN PATENT DOCUMENTS

| | | |
|---|---|---|
| 1129844 | 5/1962 | Fed. Rep. of Germany . |
| 830326 | 3/1960 | United Kingdom . |
| 832665 | 4/1960 | United Kingdom . |
| 911492 | 11/1962 | United Kingdom . |
| 1056780 | 1/1967 | United Kingdom . |

Primary Examiner—Richard A. Bertsch
Attorney, Agent, or Firm—Scrivener, Clarke, Scrivener and Johnson

[57] ABSTRACT

A vehicle gas suspension system consists of a suspension unit, a high pressure reservoir, a low pressure reservoir and an electrically driven pump. Control valves are disposed in connection lines between the unit and the reservoirs for respectively controlling the flow of gas to and from the suspension unit so as to maintain the ride height of the vehicle at a suitably adjusted attitude irrespective of vehicle loading. The pump comprises a tubular barrel, a valve at one end of the barrel, and a piston and flexible seal which reciprocate in the barrel reservoirs. A vacuum relief valve in the wall of the low pressure reservoir allows air to be drawn into the reservoir from the atmosphere, and a dump valve opens to allow gas to flow from the high pressure reservoir to the low pressure reservoir when a maximum permitted pressure is reached in the high pressure reservoir.

19 Claims, 1 Drawing Figure

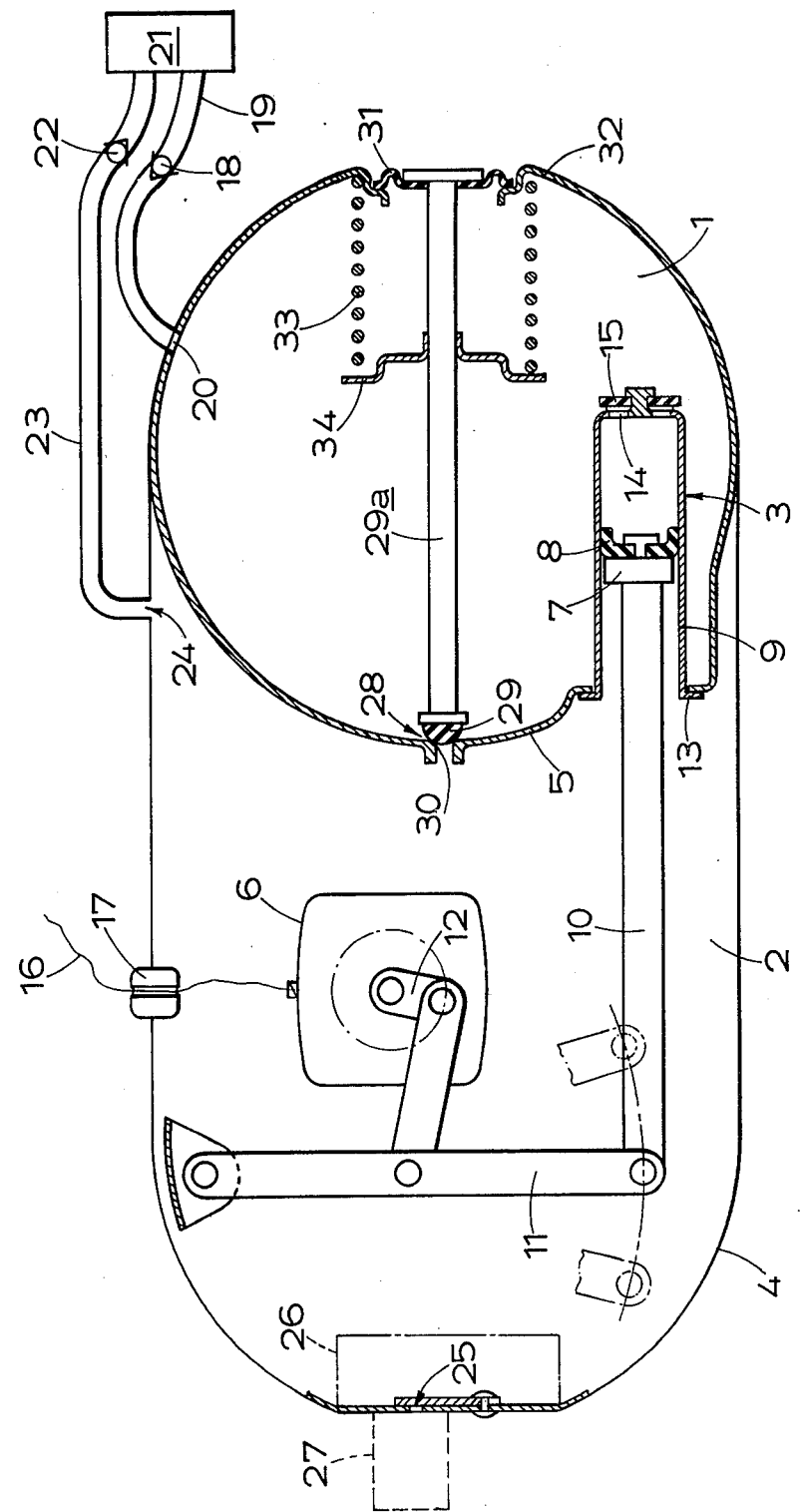

GAS SUSPENSION SYSTEMS FOR VEHICLES

SPECIFIC DESCRIPTION

This invention relates to vehicle suspension systems of the kind incorporating a suspension unit in which is contained a volume of gas under pressure to define a gas spring for supporting the load on a wheel or axle.

It is well known in vehicle suspension systems of the kind set forth to pump gas to the gas springs in order to maintain the ride height of the vehicle at a suitably adjusted attitude irrespective of the loading of the vehicle. This is known, and will be referred to herein, as "levelling".

It is often desired to use an electrically driven pump to supply the gas to the suspension unit, since adjustment of the vehicle attitude is not frequently required. It is possible to operate such a pump when the engine of the vehicle is not running. A disadvantage in using an electrically driven pump is that unless the levelling of the vehicle takes place over a relatively long time, an excessive amount of power will be drawn from the electrical system.

In previously known suspension systems air drawn from the atmosphere is compressed and pumped to appropriate suspension units in order to raise the vehicle. The vehicle is subsequently lowered by the release of air from units to the atmosphere. It is necessary in such a system to provide drying and filtration means in order to eliminate condensation of water vapour which may be harmful to parts of the system. The drying and filtration means are therefore constantly in use and periodically require maintenance or replacement.

According to our invention in a vehicle suspension system of the kind set forth the suspension unit is adapted to level the vehicle, and the system incorporates high pressure and low pressure reservoirs, connection means between an outlet in the high pressure reservoir and the suspension unit, connection means between the suspension unit and an inlet in the low pressure reservoir, control valves disposed in the connection means for controlling the flow of gas from the high pressure reservoir to the unit and from the unit to the low pressure reservoir, and a pump for maintaining a pressure difference between the reservoirs.

The energy storage provided by the difference in pressure between the reservoirs enables a pump of relatively small capacity to be used so that a given rate of levelling can be obtained for less power drawn from the supply in comparison with known systems.

The gas system may be completely sealed from the atmosphere and provided that the gas to be used is initially dried, drying and filtration means need not be provided. In such a construction the gas may comprise nitrogen.

Alternatively at least one reservoir communicates with the atmosphere through a relief valve and the reservoir volumes are chosen such that, after air has been initially introduced into the reservoirs, only small volumes of air relative to the total reservoir volumes pass through the relief valve from the reservoir to atmosphere and from atmosphere to the reservoir.

In such a case drying and filtration means may be provided to ensure the quality of the air drawn in through the relief valve. Since very little "breathing" of air takes place, the drying and filtration means requires minimal maintenance.

Preferably the low pressure reservoir communicates with the atmosphere through a vacuum relief valve, and the reservoirs communicate with each other through a spring loaded dump valve, the relief valve setting a minimum permitted pressure for the gas in the low pressure reservoir and the dump valve setting a maximum permitted pressure for the gas in the high pressure reservoir.

The dump valve eliminates a problem caused by "blow-off" and allows the maximum permitted pressure in the high pressure reservoir to be set slightly above the pump cut-out pressure.

"Blow-off" can occur when a relief valve is disposed between the high pressure reservoir and the atmosphere and the maximum pressure set by the relief valve is set slightly above the pump cut-out pressure. A high pressure generated by the pump when cold can subsequently rise to an excessive value as the temperature rises, causing air to be "blown-off" into the atmosphere through the valve. Air, and consequently harmful water vapour, can be drawn into the reservoir under subsequent conditions. With a dump valve instead of a relief valve a temperature rise merely causes air to escape through the valve to the low pressure reservoir.

The pump may be electrically driven to provide a suitable difference in pressures between the reservoirs.

Conveniently the reservoirs are incorporated within a common casing and comprise compartments divided by a partition in the casing.

Preferably the pump is located in the partition between the reservoirs and is driven by a motor within the reservoirs.

One embodiment of our invention is illustrated in the single FIGURE of the accompanying drawing which is a section through a combined pump and reservoir assembly for a vehicle air suspension system.

In the assembly illustrated a high pressure reservoir 1, a low pressure reservoir 2, and an electrically driven pump 3 are incorporated within a generally cigar-shaped casing 4.

A partition 5 divides the casing 4 into a generally spherical compartment which forms the high pressure reservoir 1 at one end of the casing, and a generally cylindrical compartment which forms the low pressure reservoir 2 and extends to the other generally hemispherical end of the casing.

The pump 3 is located in the partition 5 between the reservoirs and is electrically driven by a motor 6 disposed within the low pressure reservoir 2. Suitably the motor is of the brushless type supplied by an inverter or other source of alternating current. This avoids the possibility of ozone contamination of the gas inside the unit which otherwise might occur due to the presence of ozone produced by brush sparking in an electric motor provided with brushes. The pump 3 comprises a piston 7 and flexible seal 8 which are reciprocated in a tubular pump barrel 9 by means of a rod 10 and a lever 11 pivotally connected to the casing wall and driven by a connecting rod and crank 12 from the drive motor 6. A flange 13 at one end of the barrel 9 is attached to the partition 5. Delivery holes 14 in the other end of the barrel 9 are covered by a flexible plastics sheet 15 to comprise a valve which provides communication between the high pressure reservoir 1 and the working space of the pump barrel 9.

The piston 7 and seal 8 constitute a suction valve, and the piston is sufficiently narrow to accommodate slight lateral motion of the rod 10 due to arcuate motion of the end of the lever 11.

Electric current is supplied to drive the motor through a wire 16 which passes through a pressure seal 17 in the wall of the casing 4.

A control valve 18 is disposed in a connection line 19 between an outlet 20 in the high pressure reservoir 1 and a suspension unit 21 adapted to be connected between the chassis or frame and an axle or wheel, of a vehicle. A further control valve 22 is disposed in a connection line 23 between the suspension unit 21 and an inlet 24 in the low pressure reservoir 2. The control valves 18, 22 respectively control the flow of gas to and from the suspension unit 21.

A conventional vacuum relief valve 25 allows air from the atmosphere to be introduced into the low pressure reservoir 2, and a dryer 26 and a filter 27 are provided to dry and clean air admitted through valve 25.

The vacuum relief valve 25 sets a minimum permitted pressure for the gas in the low pressure reservoir 2.

A dump valve 28 provided between the reservoirs comprises a valve member 29 which engages in a closed position with a seating 30 in the partitions 5. A diaphragm 31 disposed in the casing end wall 32 of the high pressure reservoir 1 is connected to the valve member 29 by a rod 29a, and a loaded spring 33 acts between the casing wall 32 and an abutment member 34 attached to the rod 29a to bias the dump valve 28 towards the closed position. The surface area of the diaphragm 31 is considerably greater than the area of the valve seating 30 so that a maximum permitted pressure for gas in the high pressure reservoir 1 set by the dump valve 28, above which gas is dumped from the high pressure reservoir 28 to the low pressure reservoir 2, is relatively independent of the pressure of gas in the low pressure reservoir 2.

It is possible to choose appropriate volumes for the reservoirs 1, 2 such that after initial introduction of air through the relief valve 25, the system does not "breath" any more air through the relief valve.

If, however, the reservoir volumes are not quite ideal, then the drier 26 and the filter 27 ensure that air entering the system is adequately dried. The drier 26 and filter 27, in this case, will last for a longer period before replacement in this system than in a conventional system.

A high pressure safety relief valve (not shown) may be fitted to the low pressure reservoir to prevent an excessive build up of pressure in the low pressure reservoir.

It will be appreciated that the inlet of the low pressure reservoir and the outlet of the high pressure reservoir may be connected to more than one suspension unit through appropriate connection lines and control valves. For example the reservoirs may be connected to the suspension units of a pair of wheels on opposite sides of a vehicle, or to the suspension units of all four wheels of a vehicle.

I claim:

1. a suspension system for levelling a vehicle comprising a suspension unit in which is contained a volume of air under pressure to define a gas spring for supporting the load on a wheel or axle, a high pressure reservoir having an outlet, a low pressure reservoir having an inlet, first connection means for connecting said outlet of said high pressure reservoir to said suspension unit, second connection means for connecting said suspension unit to said inlet of said low pressure reservoir, a first control valve disposed in said first connection means for controlling the flow of air from said high pressure reservoir to said suspension unit, a second control valve disposed in said second connection means for controlling the flow of air from said suspension unit to said low pressure reservoir, a pump for maintaining a pressure difference between said high pressure reservoir and said low pressure reservoir, a vacuum relief valve provided in said low pressure reservoir to allow communication between the atmosphere and said low pressure reservoir, and a spring-loaded dump valve which is provided to allow communication between said high pressure reservoir and said low pressure reservoir.

2. A system according to claim 1, wherein drying means and filtration means are provided to ensure the quality of air which passes through said relief valve from the atmosphere to said low pressure reservoir.

3. A system according to claim 1, wherein said dump valve comprises a valve seating, a valve member engageable with said valve seating, a spring urging said valve member into engagement with said valve seating, and a diaphragm which is disposed in a wall of said high pressure reservoir and is connected to said valve member whereby the pressure of the air in said high pressure reservoir acts against the force in said spring.

4. A system according to claim 3, wherein said diaphragm has a surface area that is substantially greater than the area of said valve seating so as to set a maximum predetermined pressure for the air in said high pressure reservoir which is relatively independent of the pressure of air in said low pressure reservoir and above which gas is dumped from said high pressure reservoir to said low pressure reservoir.

5. A system according to claim 1 incorporating a casing which comprises a pair of compartments and a partition disposed between said compartments, one of said compartments constituting said low pressure reservoir and other of said compartments constituting said high pressure reservoir.

6. A system according to claim 5, wherein said pump is located in said partition between said compartments.

7. A system according to claim 5 or claim 6, which incorporates an electric motor disposed within one of said reservoirs for driving said pump.

8. A system according to claim 7, wherein said motor comprises an alternating current motor of the brushless type.

9. A system as claimed in claim 1, wherein said pump comprises a positive displacement pump.

10. A system as claimed in claim 9, wherein said pump comprises a tubular pump barrel having one end for connection to said high pressure reservoir and another end for connection to said low pressure reservoir, a piston and a flexible seal reciprocable within said barrel, a working space defined between said one end of said barrel and said piston, and a valve located at said one end of said barrel to provide communication between said working space and said high pressure reservoir.

11. A suspension system for levelling a vehicle comprising a plurality of suspension units in each of which is contained a volume of air under pressure to define a gas spring for supporting the load on a wheel or axle, a high pressure reservoir having an outlet, a low pressure reservoir having an inlet, a plurality of first connection means for connecting said outlet of said high pressure reservoir to said suspension units, a plurality of second connection means for connecting said suspension units to said inlet of said low pressure reservoir, a first control valve disposed in each one of said first connection means for controlling the flow of air from said high pressure reservoir to a respective one of said suspension units, a second control valve disposed in each one of said second connection means for controlling the flow of air from a respective one of said suspension units to said low pressure reservoir, a pump for maintaining a pressure difference between said high pressure reservoir and said low pressure reservoir, a vacuum relief valve provided in said low pressure reservoir to allow communication between the atmosphere and said low pressure reservoir, and a spring-loaded dump valve which is provided to allow communication between said high pressure reservoir and said low pressure reservoir.

12. A suspension system for levelling a vehicle comprising a suspension unit in which is contained a volume of gas under pressure to define a gas spring for supporting the load on a wheel or axle, a casing which comprises a pair of compartments and a partition disposed between said compartments, one of said compartments constituting a low pressure reservoir having an inlet and other of said compartments constituting a high pressure reservoir having an outlet, first connection means for connecting said outlet of said high pressure reservoir to said suspension unit, second connection means for connecting said suspension unit to said inlet of said low pressure reservoir, a first control valve disposed in said first connection means for controlling the flow of said gas from said high pressure reservoir to said suspension unit, a second control valve disposed in said second connection means for controlling the flow of said gas from said suspension unit to said low pressure reservoir, and a pump for maintaining a pressure difference between said high pressure reservoir and said low pressure reservoir.

13. A system according to claim 12, wherein said pump is located in said partition between said compartments.

14. A system according to claim 12 or claim 13, which incorporates an electric motor disposed within one of said reservoirs for driving said pump.

15. A system according to claim 14, wherein said motor comprises an alternating current motor of the brushless type.

16. A system according to claim 12, wherein said system is completely sealed from the atmosphere.

17. A system according to claim 16, wherein said gas contained therein comprises nitrogen.

18. A system according to claim 12, wherein said gas contained therein comprises air, and a relief valve is provided in at least one of said reservoirs to allow communication between the atmosphere and said one reservoir.

19. A suspension system for levelling a vehicle comprising a suspension unit in which is contained a volume of gas under pressure to define a gas spring for supporting the load on a wheel or axle, a high pressure reservoir having an outlet, a low pressure reservoir having an inlet, first connection means for connecting said outlet of said high pressure reservoir to said suspension unit, second connection means for connecting said suspension unit to said inlet of said low pressure reservoir, a first control valve disposed in said first connection means for controlling the flow of said gas from said high pressure reservoir to said suspension unit, a second control valve disposed in said second connection means for controlling the flow of said gas from said suspension unit to said low pressure reservoir, and a pump for maintaining a pressure difference between said high pressure reservoir and said low pressure reservoir, wherein said pump comprises a tubular pump barrel having one end for connection to said high pressure reservoir and another end for connection to said low pressure reservoir, a piston and a flexible seal reciprocable within said barrel, a working space defined between said one end of said barrel and said piston, and a valve located at said one end of said barrel to provide communication between said working space and said high pressure reservoir.

* * * * *